(12) United States Patent
Fujita et al.

(10) Patent No.: US 7,273,254 B2
(45) Date of Patent: Sep. 25, 2007

(54) VEHICLE SEAT UNIT

(75) Inventors: Satoshi Fujita, Fuchu-cho (JP); Kousei Nakano, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 359 days.

(21) Appl. No.: 10/488,954

(22) PCT Filed: May 7, 2003

(86) PCT No.: PCT/JP03/05682

§ 371 (c)(1),
(2), (4) Date: Mar. 9, 2004

(87) PCT Pub. No.: WO03/095264

PCT Pub. Date: Nov. 20, 2003

(65) Prior Publication Data

US 2005/0012373 A1    Jan. 20, 2005

(30) Foreign Application Priority Data

May 14, 2002 (JP) .............................. 2002-138873

(51) Int. Cl.
*B60N 2/00* (2006.01)
(52) U.S. Cl. ..................... 297/331; 297/340; 297/378.1
(58) Field of Classification Search ................ 297/331, 297/334, 335, 336, 340, 332, 378.1
See application file for complete search history.

(56) References Cited

U.S. PATENT DOCUMENTS 3,113,801 A * 12/1963 Caley .......................... 296/66
4,382,629 A * 5/1983 Froumajou ................... 297/322
6,196,613 B1 * 3/2001 Arai ......................... 296/65.13

FOREIGN PATENT DOCUMENTS

DE          10055432 A     5/2001

(Continued)

OTHER PUBLICATIONS

Notice of Reasons for Rejection, Mailed on Feb. 14, 2006.

(Continued)

*Primary Examiner*—Milton Nelson, Jr.
(74) *Attorney, Agent, or Firm*—Nixon Peabody LLP; Donald R. Studebaker (57) ABSTRACT

The invention is intended to improve operability of a seat unit in a process of turning it from an approximately horizontal storage position to a seating position. An upper end of a seatback (SB) in its seating position and a rear end of a seat cushion (SC) are joined together by a string (23), and two helical springs (biasing members) are provided at a forward portion of the seat cushion (SC). The first helical spring (39) exerts an upward biasing force which is smaller than the weight of the seat cushion (SC) against the seat cushion (SC), while the second helical spring (38) exerts an upward biasing force which is larger than the weight of the seat cushion (SC) against the seat cushion (SC). With this arrangement, a rear portion of the seat cushion (SC) is lifted when the seat is turned from the seating position to the storage position, and a small force is needed for lifting the seat cushion (SC) when it is turned in a reverse direction. The seat unit can be brought to the seating position by a single action since the seatback (SB) and the seat cushion (SC) are joined to each other by the string (23).

11 Claims, 7 Drawing Sheets

FOREIGN PATENT DOCUMENTS

| | | |
|---|---|---|
| GB | 940568 A | 10/1963 |
| GB | 2 367 041 A | 3/2002 |
| JP | 06-144092 | 5/1994 |
| JP | 6-79636 * | 11/1994 |
| JP | 2002-96662 | 4/2002 |
| JP | 2002-96663 | 4/2002 |
| JP | 2002096663 A | 4/2002 |
| JP | 2003054297 | 2/2003 |

OTHER PUBLICATIONS

International Search Report filed on Mar. 9, 2004 for International Application No. PCT/JP 03/05682.

* cited by examiner

VEHICLE SEAT UNIT

TECHNICAL FIELD

This invention relates to a seat unit for a vehicle.

BACKGROUND ART

A vehicle seat unit of the prior art is found in Japanese Unexamined Patent Publication No. 2002-96663. FIG. 7 shows the vehicle seat unit disclosed in this Unexamined Patent Publication No. 2002-96663, in which FIG. 7A shows a condition that enables an occupant to be seated, FIG. 7B shows a condition where a seat cushion 90 has been swung to an upright position by lifting its rear end, and FIG. 7C shows a condition where the rear end of the seat cushion 90 has been turned frontward from the condition of FIG. 7B down to an approximately horizontal position and, after sliding seat rails rearward, a seatback 91 has been turned frontward (to a reversed position).

Figure 7A:
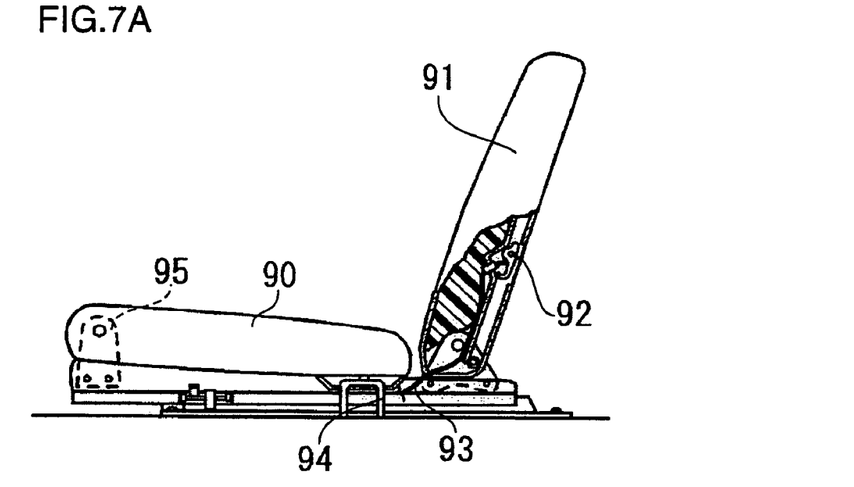
FIGS. 7A through 7C show a prior art example.
Figure 7B:
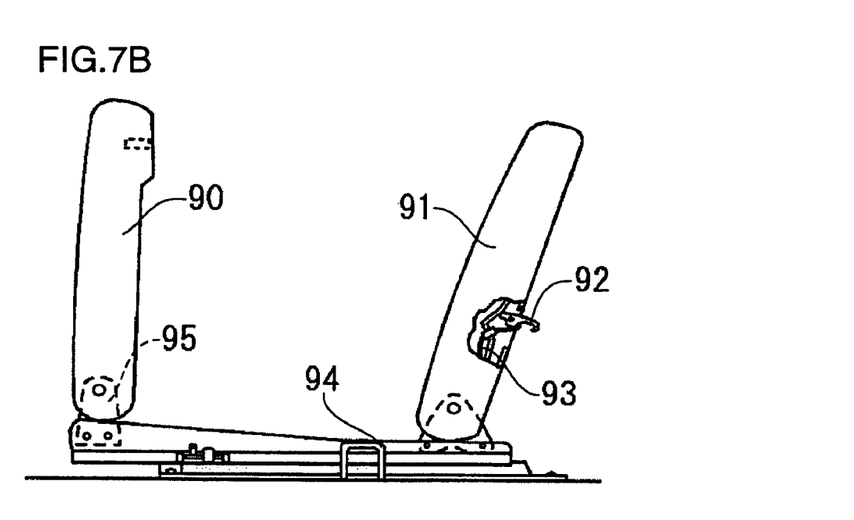
Figure 7C:
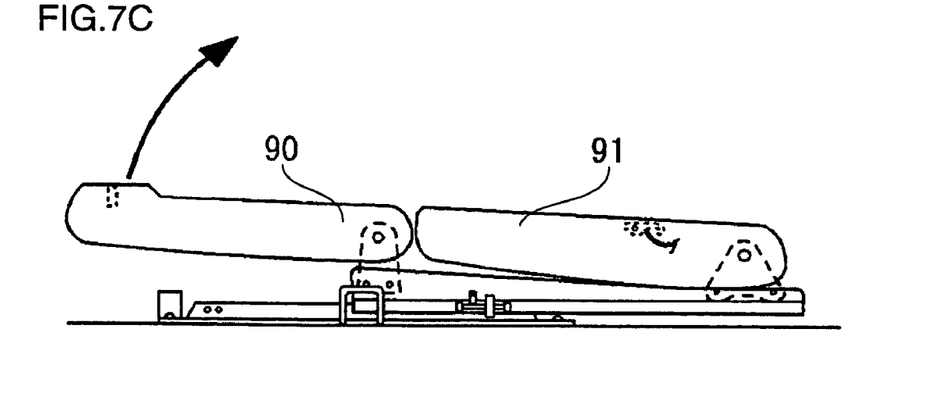

Specifically, when a lever 92 of a lock mechanism provided in the seatback 91 is operated in the condition of FIG. 7A, a cable 93 is pulled, a latch (not shown) provided at the seat bottom to fix the seat cushion 90 in position is disengaged from a striker 94 and, then, the rear end of the seat cushion 90 is turned upward by a spring (not shown) provided at a seat front bracket 95. Subsequently, the seat cushion 90 is turned frontward down to the approximately horizontal position with the aid of its own weight according to the Publication.

However, the seat cushion 90 is normally considerably heavy as it incorporates a frame unit (not shown) to prevent deformation of the seat cushion 90 and to give a comfortable ride. For this reason, it is necessary to exert a great force when turning the seat cushion 90 from its reversed position shown in FIG. 7C to the position of FIG. 7B (as shown by an arrow) in the construction of the aforementioned Unexamined Patent Publication No. 2002-96663, resulting in poor operability. Operability is further worsened by two-step operation involving the need to turn up the seatback 91 and then the seat cushion 90.

In light of the foregoing, it is an object of the invention to reduce the amount of force needed for turning a seat cushion from its approximately horizontal position to a position where an occupant can be seated on a seat unit by operating the seat cushion, thereby achieving an improvement in operability.

DISCLOSURE OF THE INVENTION

A seat unit for a vehicle according to a first construction of the invention includes a seat cushion which can take either a seating position where its cushion face is directed upward to allow an occupant to be seated or a reversed position where the cushion face is directed downward with a forward end of the seat cushion in its seating position supported by a pivot of a support member to make the seat cushion swingable, a seatback which can take either an upright position where it is set to an approximately vertical position or a forwardly turned position where it is turned frontward with a lower end of the seatback in its upright position supported by a pivot of a support member to make the seatback swingable, and a biasing member for exerting an upward biasing force against a rear end of the seat cushion when it is in the reversed position.

According to the first construction of the invention, the seat can take either the seating position where the occupant is allowed to be seated or the reversed position where the cushion face of the seat cushion is directed downward such that luggage or the like can be placed. This construction not only offers enhanced convenience of the vehicle but, with the provision of the biasing member for exerting an upward biasing force against a forward portion of the seat cushion in its reversed position, reduces the amount of force needed for lifting the seat cushion from its reversed position, thereby achieving an improvement in operability.

A seat unit for a vehicle according to a second construction of the invention is characterized in that the biasing member exerts its biasing force only when the seat cushion is between the reversed position and an approximately vertical position.

According to the second construction of the invention, the biasing member exerts its biasing force only when the seat cushion is between the reversed position and the approximately vertical position, so that it is possible to reduce the amount of force needed for lifting the seat cushion from its reversed position. In addition, since the biasing member exerts only an extremely small biasing force or no biasing force at all when the seat cushion is in its approximately vertical position, it is possible to prevent the seat cushion from falling down with impact toward the seating position due to the biasing force. This means that the biasing member exerts its biasing force only when the seat cushion is lifted from the reversed position where the largest force is needed. This offers a further improvement in operability.

A seat unit for a vehicle according to a third construction of the invention is characterized in that the biasing member exerts its upward biasing force when the seat cushion turns from the approximately vertical position to the reversed position by its own weight, the upward biasing force being smaller than a downward-directed force produced by the weight of the seat cushion.

According to the third construction of the invention, the biasing member exerts its upward biasing force when the seat cushion turns from the approximately vertical position to the reversed position by its own weight, the upward biasing force being smaller than the downward-directed force produced by the weight of the seat cushion. This construction serves to prevent the seat cushion from falling down to the reversed position with impact when it is turned from the approximately vertical position to the reversed position. In addition, the construction serves to prevent the seat cushion from rising by itself from the reversed position.

A seat unit for a vehicle according to a fourth construction of the invention is characterized by further including an interlock device by which the seat cushion is lifted in interlocked action with the seatback when the seatback is lifted from the forwardly turned position to the upright position.

According to the fourth construction of the invention, the seatback is made such that it can take either the approximately vertical position where the occupant is allowed to be seated or the forwardly turned position where luggage or the like can be placed, thereby offering enhanced convenience of the vehicle. Particularly when the reversed position of the seat cushion explained with reference to the aforementioned first construction and the forwardly turned position of the seatback are combined, a portion of the seat unit can be used as a luggage platform, so that the convenience of the vehicle is dramatically enhanced.

Furthermore, according to the fourth construction of the invention, the seat unit is provided with the interlock device by which the seat cushion is lifted in interlocked action with the seatback when the seatback is lifted from the forwardly turned position to the upright position. This construction serves to offer extremely good operability, since ordinary two-step operation involving the need to individually lift up the seatback and the seat cushion can be performed by a single action.

A seat unit for a vehicle according to a fifth construction of the invention is characterized in that the interlock device includes a flexible tie member interconnecting the rear end of the seat cushion and an upper end of the seatback.

According to the fifth construction of the invention, the tie member interconnects the rear end of the seat cushion, or the forward end of the seat cushion in its seating position, and the upper end of the seatback, or a forward end of the seatback in its forwardly turned position, so that the forward end of the seat cushion is lifted in interlocked action with the seatback when the seatback is swung up. Thus, the fifth construction offers good operability. Furthermore, because the tie member is a flexible member, operation is easy, and the seat set to the seating position does not interfere with sitting action of the occupant, whereas the seat converted to a luggage platform where luggage can be placed does not interfere with loading and unloading of the luggage.

A seat unit for a vehicle according to a sixth construction of the invention is characterized by further including a second biasing member for exerting an upward biasing force against a rear portion of the seat cushion when it is in the seating position.

According to the sixth construction of the invention, the seat unit is provided with the second biasing member for exerting an upward biasing force against the rear portion of the seat cushion when it is in the seating position. This construction serves to reduce the amount of force needed for lifting the seat cushion from its seating position, or eliminate the need to manually lift the seat cushion up to a specific angle, thereby achieving an improvement in operability.

A seat unit for a vehicle according to a seventh construction of the invention is characterized in that the second biasing member exerts its biasing force only when the seat cushion is between the seating position and the approximately vertical position.

According to the seventh construction of the invention, the second biasing member exerts its biasing force only when the seat cushion is between the seating position and the approximately vertical position. This construction serves to reduce the amount of force needed for lifting the seat cushion from its seating position and prevent the seat cushion from falling beyond the approximately vertical position down to the reversed position with impact when it is lifted from the seating position to the approximately vertical position.

A seat unit for a vehicle according to an eighth construction of the invention is characterized in that the second biasing member exerts its biasing force in such a way that the seat cushion is swung up by a specific angle which is smaller than a right angle, and the seat unit further includes a lock mechanism for holding the seat cushion in the seating position and an unlock mechanism for unlocking the lock mechanism.

According to the eighth construction of the invention, the second biasing member exerts its biasing force in such a way that the seat cushion is swung up by a specific angle which is smaller than a right angle, so that this construction exhibits those effects which have been explained with reference to the aforementioned sixth or seventh construction to a greater extent. In addition, the provision of the lock mechanism for holding the seat cushion in the seating position and the unlock mechanism for unlocking the lock mechanism serves to prevent the seat cushion from rising by itself due to the biasing force of the second biasing member when the seat cushion is in the seating position and the occupant is not seated. Furthermore, the seat cushion rises from the seating position up to a specific position immediately when the lock mechanism has been unlocked. This ensures smooth and easy operation when turning the seat cushion from the seating position to the reversed position through the vertical position.

A seat unit for a vehicle according to a ninth construction of the invention includes a seat cushion which can take either a seating position where its cushion face is directed upward to allow an occupant to be seated or a reversed position where the cushion face is directed downward with a forward end of the seat cushion in its seating position supported by a pivot of a support member to make the seat cushion swingable, a seatback which can take either an upright position where it is set to an approximately vertical position or a forwardly turned position where it is turned frontward with a lower end of the seatback in its upright position supported by a pivot of a support member to make the seatback swingable, and an interlock device by which the seat cushion is lifted in interlocked action with the seatback when the seatback is lifted from the forwardly turned position to the upright position.

According to the ninth construction of the invention, the seat unit includes the seat cushion which can take either the seating position or the reversed position and the seatback which can take either the upright position or the forwardly turned position. The seat unit thus constructed is highly convenient serving a seating function for seating the occupant as well as a platform function for loading luggage. Furthermore, the seat cushion is lifted from the reversed position in interlocked action with the seatback when the seatback is lifted from the forwardly turned position. This serves to offer extremely good operability, since ordinary two-step operation involving the need to individually lift up the seatback and the seat cushion can be performed by a single action.

A seat unit for a vehicle according to a tenth construction of the invention is characterized in that the interlock device includes a flexible tie member interconnecting a rear end of the seat cushion and an upper end of the seatback.

According to the tenth construction of the invention, the tie member interconnects the rear end of the seat cushion, or a forward end of the seat cushion in its seating position, and the upper end of the seatback, or a forward end of the seatback in its forwardly turned position, so that the forward end of the seat cushion is lifted in interlocked action with the seatback when the seatback is swung up as explained in connection with the aforementioned ninth construction. Thus, the tenth construction offers good operability. Furthermore, because the tie member is a flexible member, operation is easy, and the seat set to the seating position does not interfere with sitting action of the occupant, whereas the seat converted to a luggage platform where luggage can be placed does not interfere with loading and unloading of the luggage.

A seat unit for a vehicle according to an eleventh construction of the invention is characterized by further including a base member supporting the seat cushion and the seatback, and a slide mechanism supporting the base member in such a manner that the base member can be slid between its seating position and a storage position located behind the seating position along a longitudinal direction of the vehicle.

According to the eleventh construction of the invention, the seat unit is provided with the base member which is made sidable between the seating position and the storage position located behind the seating position along the longitudinal direction of the vehicle, so that the occupant can easily vary the seating position according to his or her preference to make the seat unit comfortable to sit in. When converting the seat unit to the luggage platform by turning the seat cushion to the reversed position and the seatback to the forwardly turned position, it is possible to make a sufficient working space to do so in the longitudinal direction by sliding the base member up to the storage position located behind the seating position. In addition, another seat unit located in front of the aforesaid seat unit can also be slid rearward to provide comfortable sitting and improved ride quality.

As so far described, the present invention makes it possible to reduce the amount of force needed for lifting the seat cushion in order to turn the seat unit from its approximately horizontal storage position to the seating position by operating the seatback and the seat cushion. The invention also enables an improvement in work efficiency and operability.

BEST MODE FOR CARRYING OUT THE INVENTION

A specific embodiment of the invention is now described with reference to the drawings.

Figure 1:
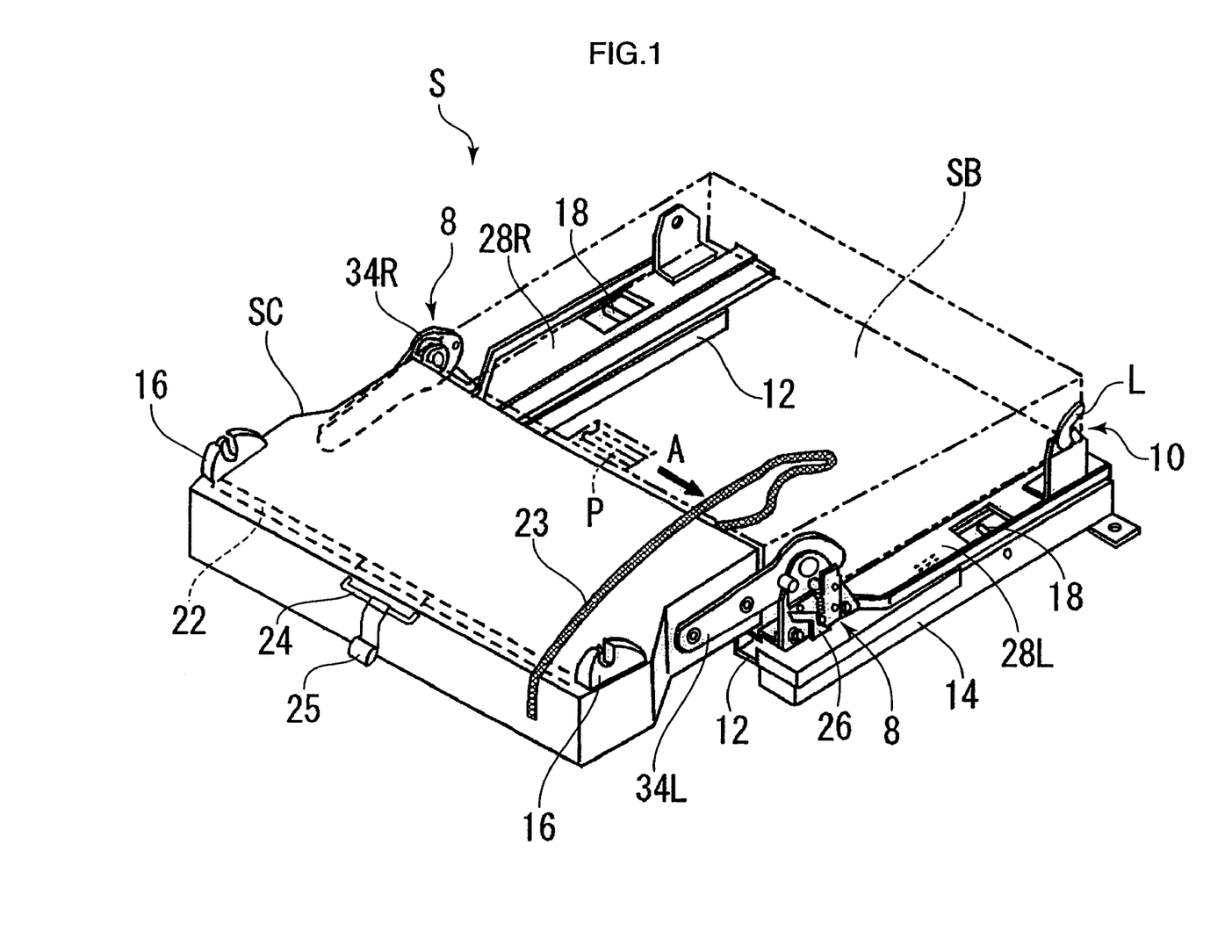
FIG. 1 is a general view of a seat unit according to the invention.
Figure 2:
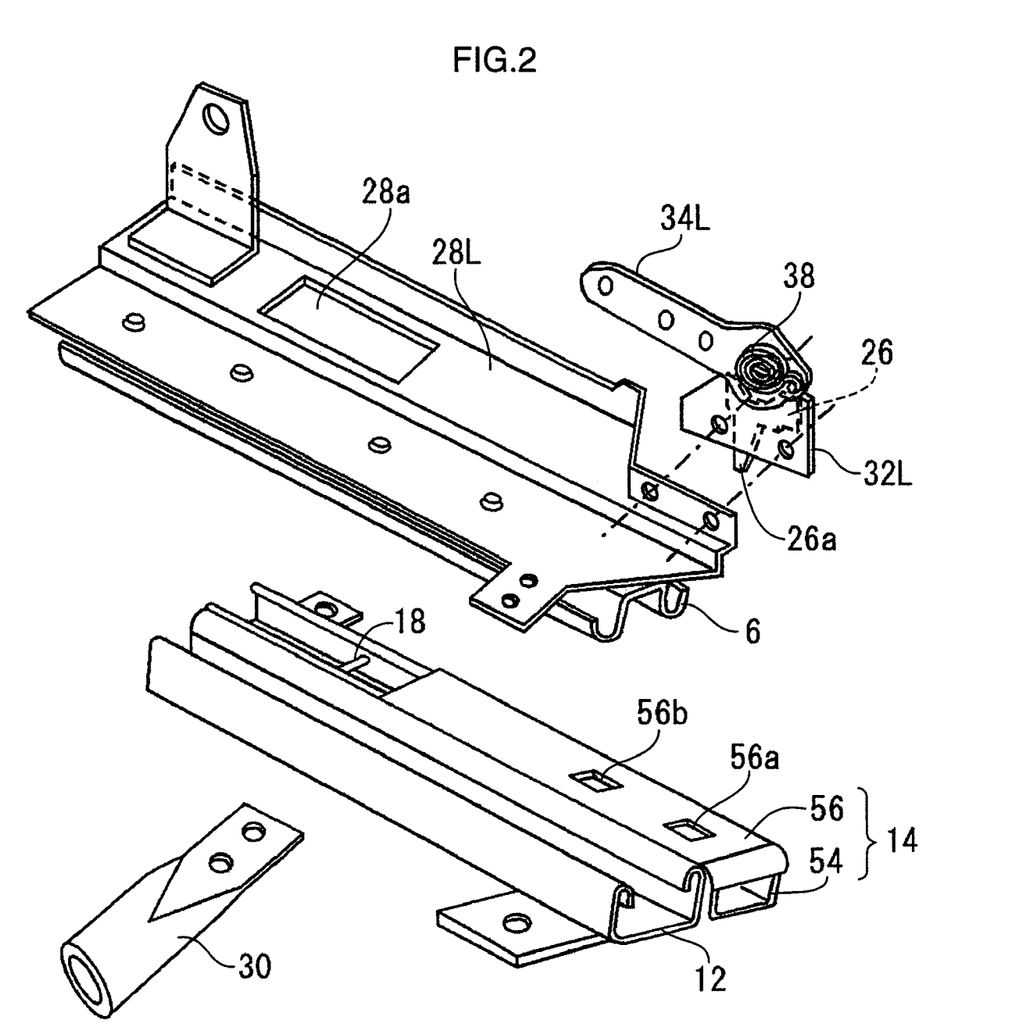
FIG. 2 is a view showing components of a slide rail mechanism of the seat unit according to the invention.

FIG. 1 is a diagram generally showing a seat unit according to the invention as it is set in a condition where a seat cushion SC of a foldable seat S for a vehicle is set to its reversed position and a seatback SB is set to its forwardly turned position, and FIG. 2 is a view showing components of a slide rail mechanism. In the following description of the embodiment, the condition in which the seat cushion SC is set to the reversed position and the seatback SB is set to the forwardly turned position is referred to as a "storage position," and a condition in which an occupant can be seated, that is, the seat cushion SC is set to an approximately horizontal position with its cushion face directed upward, and the seatback SB is set to an approximately vertical upright position is referred to as a "seating position."

As shown in FIGS. 1 and 2, the seat cushion SC is swingably attached to forward portions of a pair of left and right upper slide rails 6 via respective turn mechanisms 8, while the seatback SB is attached to rear portions of the upper slide rails 6 via a pair of left and right hinge mechanisms 10 in a manner that the seatback SB can be turned down. The left and right upper slide rails 6 are mounted on respective lower slide rails 12 which are fixed to the floor of the vehicle body so that the upper slide rails 6 can slide back and forth in the longitudinal direction of the vehicle. The upper slide rails 6 and the lower slide rails 12 together constitute a seat slide mechanism. Provided on the outside of the seat slide mechanism is a side member 14 which is fixed to the floor of the vehicle body.

Figure 3:
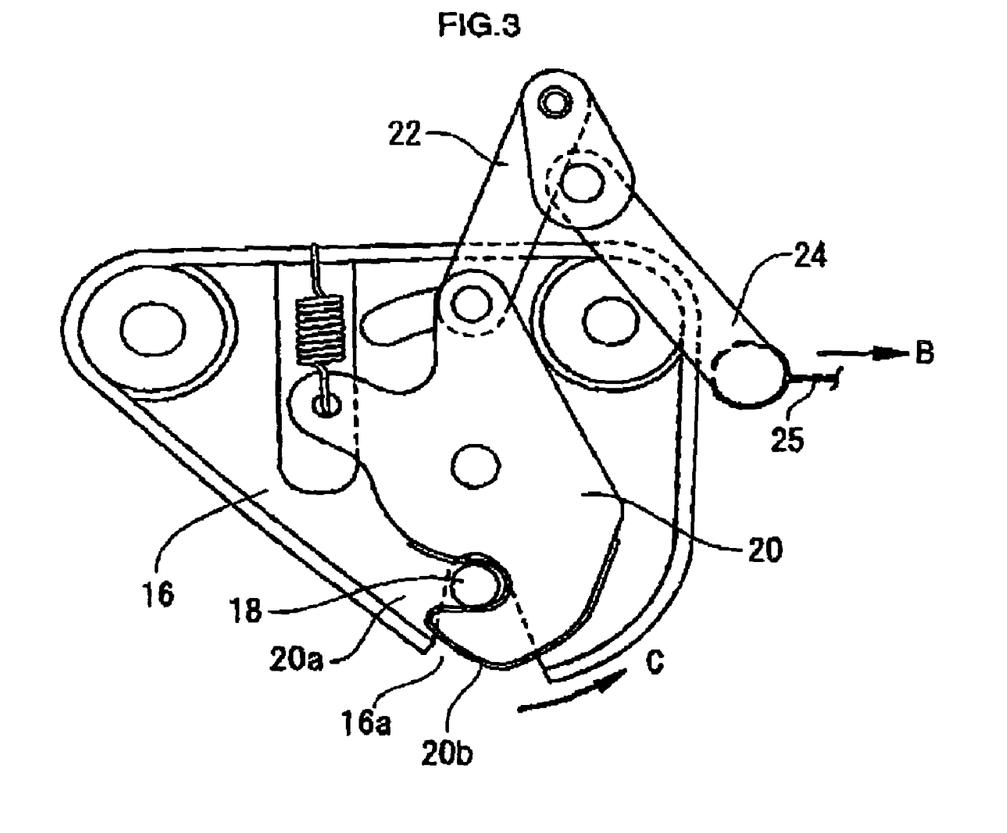
FIG. 3 is a diagram showing a seat cushion lock mechanism.

A seat cushion frame (not shown) is installed inside the seat cushion SC and latches 16 respectively having latch grooves 16*a* (refer to FIG. 3 showing a seat cushion lock mechanism) are joined to rear left and right side portions of the seat cushion frame in such a fashion that the latches 16 protrude downward from the bottom of the seat cushion SC as it is held in an approximately horizontal seating position. Forks 20 mounted on shafts are affixed to the respective latches 16. The forks 20 serve as locking members which fit on respective strikers 18, with a locking groove 20*a* formed in each fork 20.

Also installed inside the seat cushion SC is a fork manipulator 22, and the left and right forks 20 mounted on the shafts are affixed to both ends of the fork manipulator 22. The fork manipulator 22 has a generally U-shaped handgrip 24 slightly projecting rearward from a rear face of the seat cushion SC and an unlocking strap 25 connected to the handgrip 24. When the unlocking strap 25 is pulled rearward (in a direction shown by arrow B), the forks 20 turn in a direction shown by arrow C and, as a consequence, they are unlocked from the strikers 18.

The slide mechanism for the seat S is now described in great detail referring to FIG. 2. While FIG. 2 shows only a left-hand slide rail mechanism as viewed by an occupant seated in a frontward-looking position, left and right slide rail mechanisms basically have a left-right symmetrical construction. A bracket 28L for supporting the bottom of the seat cushion SC and holding a lock plate 26 movably up and down is joined to a top surface of the upper slide rail 6 which constitutes part of the seat slide mechanism, a pair of left and right brackets 28L, 28R (refer to FIG. 1) being joined to each other by means of a connecting member 30 extending in the direction of the vehicle width.

A lower end portion of a lock plate support 32L is fixed to a forward end portion of the left-hand bracket 28L and a seat cushion support 34L serving as a pivot bar is connected to a forward end portion of the seat cushion frame. Provided on the inside of the seat cushion support 34L is a helical spring 38 serving as a seat cushion biasing member which will be described later in detail with reference to FIGS. 5 and 6.

The side member 14 includes a lower member 54 having an approximately U-shaped cross section and fixed to the floor of the vehicle body and an upper member 56 joined to the lower member 54. There are provided two rectangular openings 56*a*, 56*b* formed in a forward portion of the upper member 56, and the striker 18 of which both ends are fixed to two facing side walls of the lower member 54 is provided in a rear portion of the lower member 54. The striker 18 is so arranged that it can lock the aforementioned latch 16 through a rectangular opening 28*a* formed in the bracket 28L.

When the seat S is set to the seating position, or when the seat cushion SC is in its approximately horizontal position before being turned to its upright position, a locking claw 26*a* of the lock plate 26 is fitted in the rectangular opening 56*a*. When the seat cushion SC is turned upward, the locking claw 26*a* is caused to ascend by an unillustrated spring mechanism and becomes released from the rectangular opening 56*a* to a free position. As a result, the seat S becomes slidable back and forth. When the seat S is slid backward and the seat cushion SC is set to its reversed position, the locking claw 26a fits in the rectangular opening 56b, thereby preventing the seat S set in the reversed position from freely sliding back and forth.

Next, movements of the seat S as it is turned from the seating position to the storage position, and vice versa, are explained referring to FIG. 4. FIG. 4A shows the movement of the seat S as it is turned from the seating position to the storage position, and FIG. 4B shows the movement of the seat S as it is returned from the storage position to the seating position. Broken lines in these Figures indicate positions taken by the seat S before it is moved while solid lines indicate positions taken by the seat S after it has been moved.

Figure 4A:
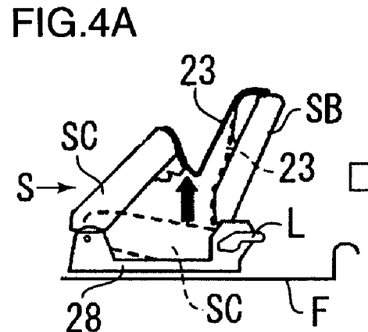
FIGS. 4A through 4F are diagrams showing operating procedures for turning the seat unit between a seating position and a reversed position.

In a step shown in FIG. 4A, when the unlocking strap 25 of the seat S is pulled rearward as it is in the seating position, the seat cushion SC is released from its locked state as explained earlier with reference to FIG. 1. At this point, the seat cushion SC stops at a position swung up as shown by a black arrow. (A lift mechanism for producing this swing-up action includes a helical spring (second biasing member) serving as a biasing member which will be described later.) In step shown in FIG. 4B, the seat cushion SC is turned frontward from this position slightly beyond the vertical position and, then, the seat S is moved rearward along the floor F of the vehicle body (in a direction shown by a hatched arrow) together with the brackets 28 with the aid of the seat slide mechanism.

Figure 4B:
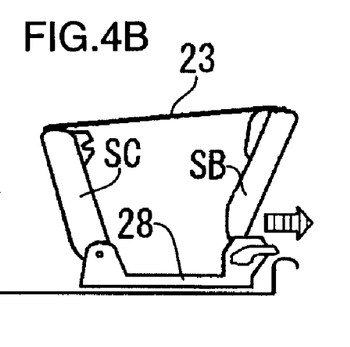

An upper end of the seatback SB and a rear end of the seat cushion SC are joined together by a string 23 so that the seat cushion SC does not turn frontward by its own weight at this point in time.

Figure 4C:
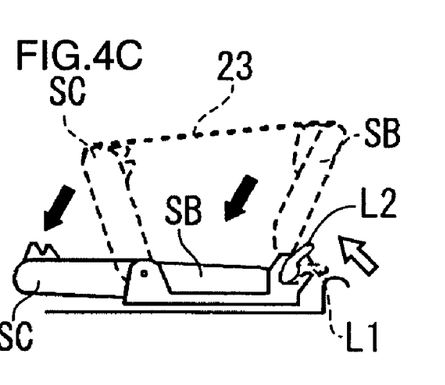

Next, in step shown in FIG. 4C, when the seatback SB is turned frontward while manipulating a lever from an approximately horizontal position L1 to an upper position L2 as shown by an arrow for turning the seatback SB frontward, the seat S is brought to the storage position where large-sized luggage or the like can be placed on the seat S, in which the seat S is approximately horizontal with the seatback SB set to the forwardly turned position and the seat cushion SC set to the reversed position.

Figure 4D:
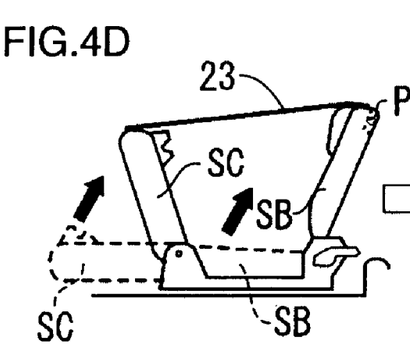
Figure 4E:
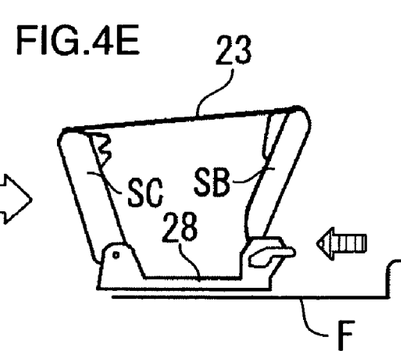
Figure 4F:
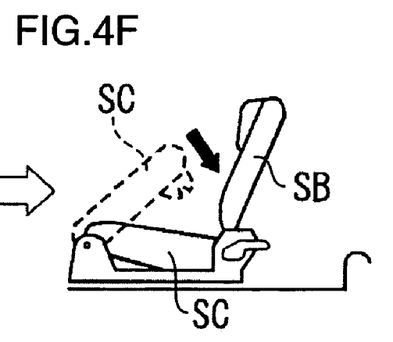

On the other hand, to bring the seat S from the storage position back to the seating position (as shown in FIG. 4D to 4F), the seatback SB is first lifted while holding a handgrip P provided at an upper rear portion of the seatback SB in step shown in FIG. 4D. Since the seat cushion SC is linked to the seatback SB by the string 23, the rear end of the seat cushion SC suspended by the seatback SB is also lifted at the same time.

Since another helical spring (first biasing member) for applying an upward force is provided at a forward position where the seat cushion SC is swung down, it is possible to lift the seat cushion SC without the need to exert a great force. (This helical spring (first biasing member) will be described later.) Operation of step shown in FIG. 4D is finished when the seatback SB has been brought back to an upright position which is its specified original position. When returned to the upright position, the seatback SB is locked into the specified position where its swing motion is prohibited. Since the seat cushion SC is linked to the seatback SB by the string 23, the seat cushion SC does not return to its reversed position even if it is slightly tilted frontward.

Next, in step shown in FIG. 4E, the seat S is pushed frontward as shown by a hatched arrow to bring it back to its specified position. Then, in step shown in FIG. 4F, the seat cushion SC is returned to its approximately horizontal position, or the seating position, by pulling the string 23 rearward. At this point, the latches 16 provided on the bottom of the seat cushion SC fit on the strikers 18 and the seat S is set to the locked state.

Figure 5:
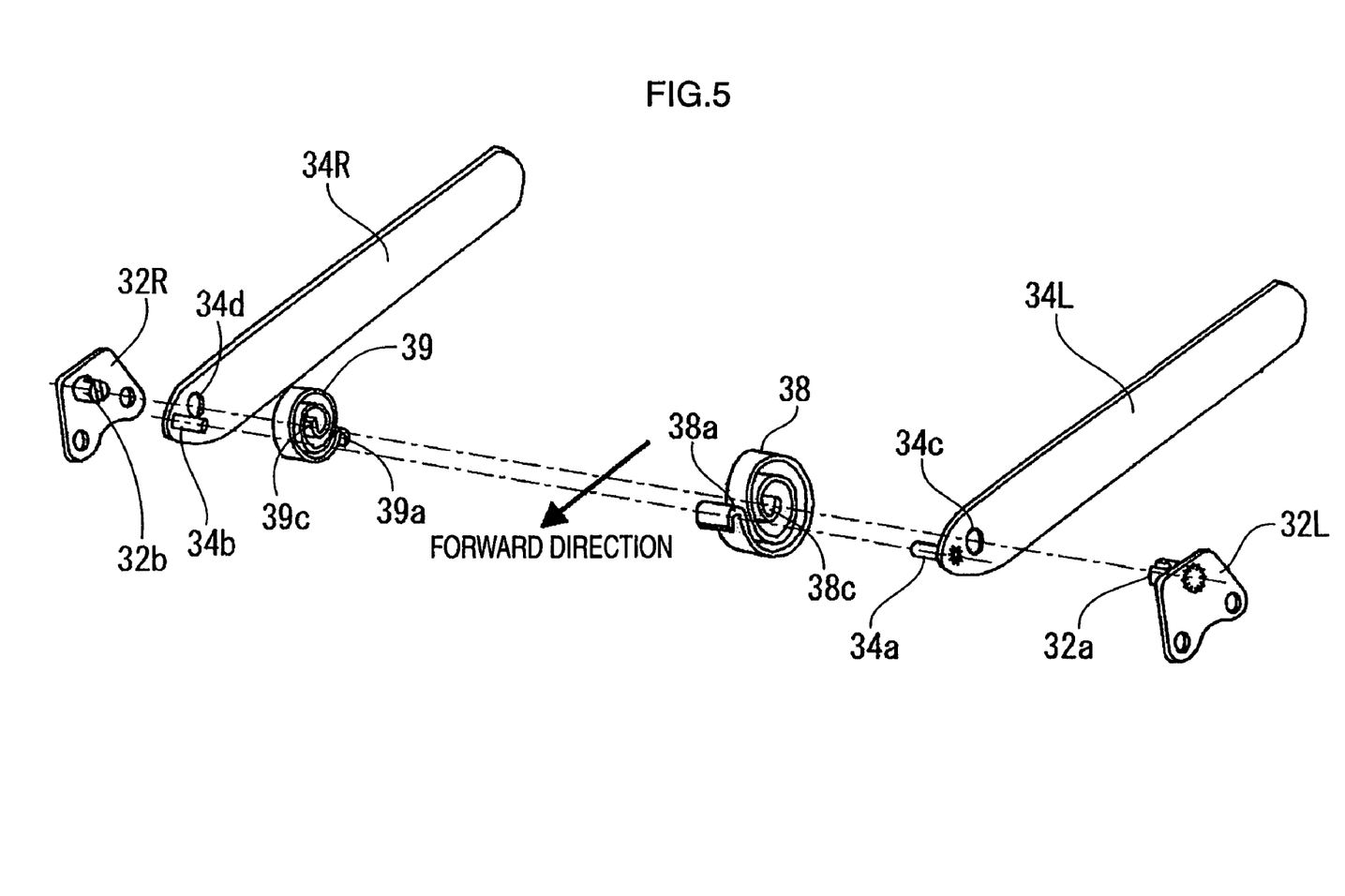
FIG. 5 is a diagram showing the arrangement and structure of helical springs.

The aforementioned helical springs (the first biasing member and the second biasing member are hereinafter referred to as the first helical spring and the second helical spring, respectively) are described in detail referring to FIG. 5 showing their arrangement and structure and FIG. 6 showing their functions, respectively.

Referring to FIG. 5, the two helical springs, i.e., the first helical spring 39 and the second helical spring 38, are provided at lower front positions of the seat cushion SC. First, the arrangement and structure of the first helical spring 39 are described. As viewed by the occupant seated in the frontward-looking position, a pin 34b extending inward and a circular hole 34d are provided at a front portion of a seat cushion support 34R which is provided at a forward right-hand corner portion of the seat cushion SC, and a lock plate support 32R is provided on the outside of the seat cushion support 34R. The lock plate support 32R is provided with a fixing pin 32b of which end is notched to form two-split prongs extending inward. The fixing pin 32b is inserted into the circular hole 34d in the seat cushion support 34R and, then, a central part 39c of the first helical spring 39 is fixed to the split end of the fixing pin 32b. The pin 34b of the seat cushion support 34R is made such that it can catch a hooking part 39a of the first helical spring 39 formed by bending its extreme outer end portion into a generally U-shape only when the seat cushion SC is between an approximately vertical position and the reversed position.

On the other hand, the second helical spring 38 having a larger biasing force than the first helical spring is provided at a forward left side of the seat cushion SC as viewed by the occupant seated in the frontward-looking position. Specifically, a pin 34a extending inward and a circular hole 34c are provided at a front portion of the seat cushion support 34L which is provided at a forward left-hand corner portion of the seat cushion SC, and the lock plate support 32L is provided on the outside of the seat cushion support 34L. The lock plate support 32L is provided with a fixing pin 32a of which end is notched to form two-split prongs extending inward. The fixing pin 32a is inserted into the circular hole 34c in the seat cushion support 34L and, then, a central part 38c of the second helical spring 38 is fixed to the split end of the fixing pin 32a. The pin 34a of the seat cushion support 34L is made such that it can catch a hooking part 38a of the second helical spring 38 formed by bending its extreme outer end portion into a generally U-shape only when the seat cushion SC is between the seating position and a position where it is swung up by approximately 30 degrees.

This means that the first helical spring 39 exerts an upward biasing force only when the seat cushion SC is between the approximately vertical position and the reversed position, whereas the second helical spring 38 exerts an upward biasing force only when the seat cushion SC is between the seating position and the position where it is swung up by approximately 30 degrees.

This is further explained referring to FIG. 6, in which "left side" is the side where the second helical spring 38 is provided and "right side" is the side where the first helical spring 39 is provided, and both the "left side" and "right side" are views as seen from outside to inside. FIG. 6A shows a condition where the seat cushion SC (not shown) is in the seating position. In this condition, the hooking part 38a of the second helical spring 38 catches on the pin 34a and the second helical spring 38 exerts its biasing force to lift up a rear portion of the seat cushion support 34L which is connected to the seat cushion SC.

Figure 6A:
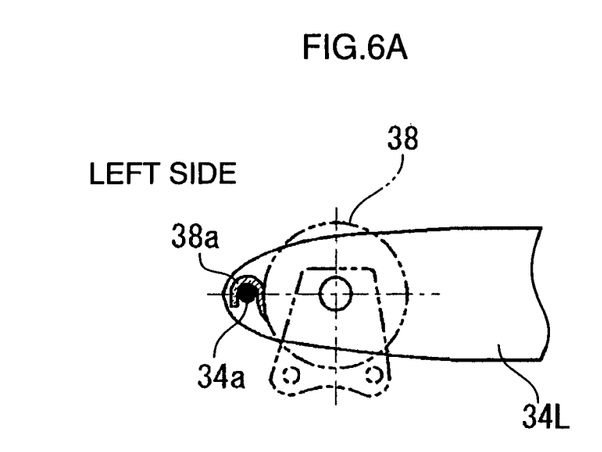
FIGS. 6A through 6E are diagrams showing the functions of the helical springs.
Figure 6B:
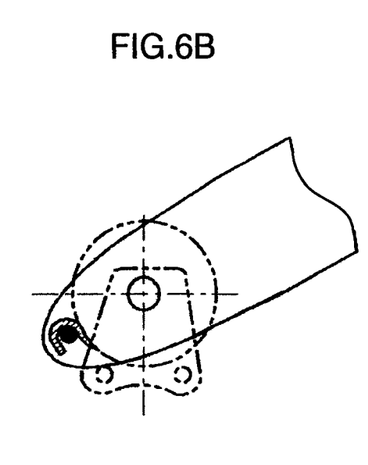

When the latches 16 are unlocked from the strikers 18 as described earlier, the rear end of the seat cushion SC is lifted by the biasing force of the second helical spring 38 up to a position shown in FIG. 6B. The position of FIG. 6B shows a condition where a balance is maintained between the weight of the seat cushion SC and the biasing force of the second helical spring 38 and the seat cushion SC is held stationary at an angle between the horizontal and 30 degrees.

Figure 6C:
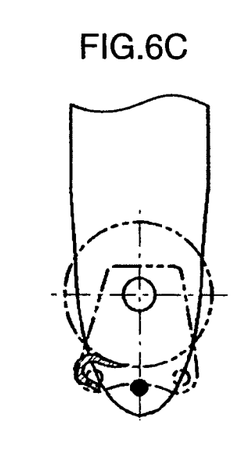

FIG. 6C shows a condition where the seat cushion SC has been swung up to an approximately vertical position. In this condition, the hooking part 38a of the second helical spring 38 is set apart from the pin 34a, so that the seat cushion SC can be easily moved as no biasing force is exerted on it. Needless to say, the second helical spring 38 exerts no biasing force even when the seat cushion SC is turned frontward to its reversed position. Although not illustrated, no biasing force is exerted on the right side where the first helical spring 39 is provided when the seat cushion SC is in the approximately vertical position, because the hooking part 39a of the first helical spring 39 is separated from the pin 34b in this condition.

Figure 6D:
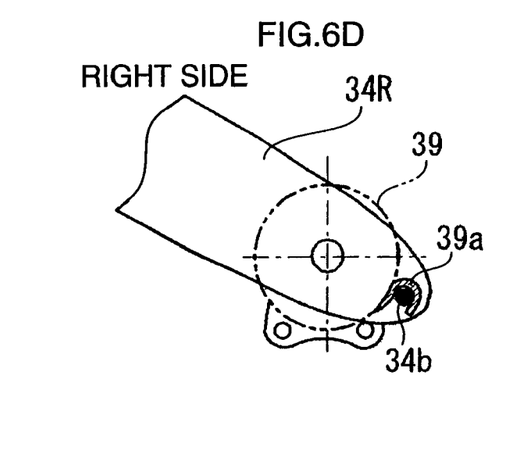

When the seat cushion SC is turned further frontward, the right side provided with the first helical spring 39 is brought to a position shown in FIG. 6D. At the position of FIG. 6D, the hooking part 39a of the first helical spring 39 is already caught by the pin 34b. In this embodiment, the first helical spring 39 has a smaller biasing force than the second helical spring 38 that is not large enough to support the weight of the seat cushion SC. Therefore, the seat cushion SC does not stay stationary at the position shown in FIG. 6D but is automatically brought to a completely reversed position shown in FIG. 6E when released. Since the first helical spring 39 exerts the upward biasing force against the seat cushion SC, however, the seat cushion SC is prevented from dropping with impact.

Figure 6E:
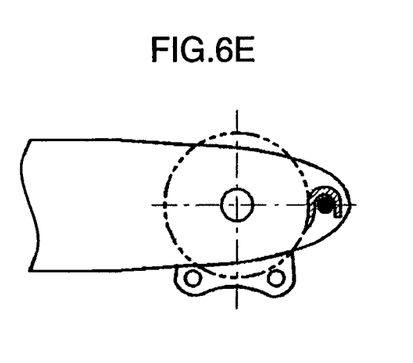

Although the first helical spring 39 exerts the upward biasing force against the seat cushion SC in its reversed position shown in FIG. 6E, the seat cushion SC is held in the approximately horizontal position because the first helical spring 39 does not produce a sufficient biasing force to lift the seat cushion SC upward overcoming its weight.

When the seat cushion SC is turned in an opposite direction from its reversed position shown in FIG. 6E to its approximately vertical position via the position shown in FIG. 6D, the first helical spring 39 exerts the upward biasing force on the seat cushion SC as previously explained with reference to FIG. 4. This allows an operator to easily lift the seat cushion SC.

As thus far described, in turning the seat S including the seatback SB and the seat cushion SC from the seating position to the approximately horizontal storage position to allow storage of luggage or the like, the rear end of the seat cushion SC is lifted by a specific angle by the biasing force exerted by the second helical spring 38 which serves as a biasing member provided at the forward portion of the seat cushion SC when the seatback SB is unlocked, and when the seatback SB and the seat cushion SC are turned to their reversed positions through approximately vertical positions, the seat cushion SC is prevented from dropping with impact to the reversed position by the biasing force exerted by the first helical spring 39 which serves as a biasing member also provided at the forward portion of the seat cushion SC according to the present invention. When the seat cushion SC has been set to the reversed position, it is allowed to remain in the approximately horizontal position because the first helical spring 39 does not have a sufficient biasing force to lift the seat cushion SC upward overcoming its weight.

When turning the seat S from the storage position to the seating position, it is possible to bring the seat cushion SC together with the seatback SB back to the upright position by just lifting the seatback SB. This is because a forward end portion of the seatback SB in its forwardly turned position (that is, the upper end of the seatback SB in the seating position) and a forward end portion of the seat cushion SC in its reversed position (that is, the rear end of the seat cushion SC in the seating position) are interconnected by the string 23 as if being bridged thereby. Furthermore, this operation can be performed without the need to exert a great force due to the upward biasing force of the first helical spring 39 provided at the seat cushion SC.

The invention claimed is:

1. A seat unit for a vehicle comprising:
    a seat cushion having a forward end thereof pivotably supported by a support member, enabling the seat cushion to move between a seating position where a cushion face of the seat cushion is directed upward to allow an occupant to be seated and a reversed position where the cushion face is directed downward;
    a seatback having a lower end thereof pivotably supported by a support member, enabling the seatback to move between an upright position where the seatback is set to an approximately vertical position and a forwardly turned position where the seatback is turned frontward; and
    an interlock device by which said seat cushion is lifted in interlocked action with said seatback when said seatback is lifted from the forwardly turned position to the upright position;
    wherein said interlock device includes a flexible tie member interconnecting a rear end of said seat cushion and an upper end of said seatback.

2. The seat unit for a vehicle according to claim 1, further comprising:
    a base member supporting said seat cushion and said seatback; and
    a slidable mechanism supporting said base member in such a manner that said base member can be slid between a seating position and a storage position located behind the seating position along a longitudinal direction of the vehicle.

3. A seat unit for a vehicle comprising:
    a seat cushion having a forward end and a rear end, said forward end being pivotably supported by a support member, enabling the seat cushion to move between a seating position where a cushion face of said seating cushion is directed upward to allow an occupant to be seated and a reversed position where the cushion face is directed downward passing through an approximately vertical position;
    a seatback having a lower end in an upright position and pivotably supported by a support member, enabling the seatback to move between said upright position where said seatback is in an approximately vertical position and a forwardly turned position where said seatback is turned frontward; and
    a biasing member for exerting an upward biasing force to the rear end of said seat cushion when said seat cushion turns from the approximately vertical position of said seat cushion to the reversed position, said upward biasing force being smaller than a downward-directed force produced by a weight of said seat cushion; and an interlock device interlocking said seat cushion and said seatback such that said seat cushion is lifted in interlocked action with said seatback when said seatback is lifted from the forwardly turned position to the upright position.

4. A seat unit for a vehicle comprising:

a seat cushion having a forward end and a rear end, said forward end being pivotably supported by a support member, enabling the seat cushion to move between a seating position where a cushion face of said seating cushion is directed upward to allow an occupant to be seated and a reversed position where the cushion face is directed downward passing though an approximately vertical position;

a seatback having a lower end in an upright position and pivotably supported by a support member, enabling the seatback to move between said upright position where said seatback is in an approximately vertical position and a forwardly turned position where said seatback is turned frontward;

a biasing member for exerting an upward biasing force to the rear end of said seat cushion when said seat back is in the reversed position; and an interlock device interlocking said seat cushion and said seatback such that said seat cushion is lifted in interlocked action with said seatback when said seatback is lifted from the forwardly turned position to the upright position.

5. The seat unit for a vehicle according to claim 4, wherein said interlock device includes a flexible tie member interconnecting the rear end of said seat cushion and an upper end of said seatback.

6. The seat unit for a vehicle according to claim 5, further comprising a second biasing member for exerting an upward biasing force to the rear portion of said seat cushion when it is in the seating position.

7. The seat unit for a vehicle according to claim 6, wherein said second biasing member exerts its biasing force only when said seat cushion turns from the seating position to the approximately vertical position.

8. The seat unit for a vehicle according to claim 7, wherein said second biasing member exerts the biasing force in such a way that said seat cushion is swung upwardly by a specific angle which is smaller than a right angle, said seat unit further comprising a lock mechanism for holding said seat cushion in the seating position and an unlock mechanism for unlocking the lock mechanism.

9. A seat unit for a vehicle comprising:

a seat cushion having a forward end and a rear end, said forward end being pivotably supported by a support member, enabling the seat cushion to move between a seating position where a cushion face of said seating cushion is directed upward to allow an occupant to be seated and a reversed position where the cushion face is directed downward passing through an approximately vertical position;

a seatback having a lower end in an upright position and pivotably supported by a support member, enabling the seatback to move between said upright position where said seatback is in an approximately vertical position and a forwardly turned position where said seatback is turned frontward;

a biasing member for exerting an upward biasing force to the rear end of said seat cushion when said seat cushion is in the reversed position; and a second biasing member for exerting an upward biasing force to a rear portion of said seat cushion when it is in the seating position.

10. A seat unit for a vehicle comprising:

a seat cushion having a forward end and a rear end, said forward end being pivotably supported by a support member, enabling the seat cushion to move between a seating position where a cushion face of said seating cushion is directed upward to allow an occupant to be seated and a reversed position where the cushion face is directed downward passing through an approximately vertical position;

a seatback having a lower end in an upright position and pivotably supported by a support member, enabling the seatback to move between said upright position where said seatback is in an approximately vertical position and a forwardly turned position where said seatback is turned frontward;

a biasing member for exerting an upward biasing force to the rear end of said seat cushion when said seat cushion is in the reversed position;

a base member supporting said seat cushion and said seatback; and a slide mechanism supporting said base member in such a manner that said base member can be slid between a seating position and a storage position located behind the seating position along a longitudinal direction of the vehicle.

11. A seat unit for a vehicle comprising:

a seat cushion having a forward end and a rear end, said forward end being pivotably supported by a support member, enabling the seat cushion to move between a seating position where a cushion face of said seating cushion is directed upward to allow an occupant to be seated and a reversed position where the cushion face is directed downward passing through an approximately vertical position;

a seatback having a lower end in an upright position and pivotably supported by a support member, enabling the seatback to move between said upright position where said seatback is in an approximately vertical position and a forwardly turned position where said seatback is turned frontward;

a lock mechanism for locking the seat cushion in said seating position;

an unlock mechanism for unlocking a locked state of the seat cushion by the lock mechanism;

a biasing member for exerting an upward biasing force to the rear end of said seat cushion in said seating position such that the seat cushion is swung upward from the seating position, upon release from the locked state by said unlock mechanism, to a predetermined angle that is less than a vertical position and said seat cushion is free from said biasing force when the seat cushion is in an angle range between an angle greater than said predetermined angle and an angle past said vertical position where the rear end of the seat cushion turns forward past said vertical position;

an interlock device for preventing the seat cushion from further turning in a forward direction when the seatback is in the upright position; and a lever member, mounted on the seatback, which allows, upon operation, said seatback in the upright position to swing forward;

wherein said seat cushion, said seatback, and said interlock device are positioned such that said interlock device allows said seat cushion in, the forwardly turned position past said vertical position, to swing further forward by its own weight when the seatback is forwardly turned upon operation of the lever member and said interlock device pulls said seat cushion, which was maintained in the reversed position, upward to an angle position before said vertical position by turning said seatback from the forwardly turned position to the upright position.

* * * * *